March 20, 1928.

C. H. BULL 1,663,332

ROCK BIT

Filed Aug. 4, 1925

Inventor
Clinton H. Bull

Attorney

March 20, 1928.

C. H. BULL 1,663,332

ROCK BIT

Filed Aug. 4, 1925

Inventor
Clinton H. Bull
Attorney

Patented Mar. 20, 1928.

1,663,332

UNITED STATES PATENT OFFICE.

CLINTON H. BULL, OF COLUMBUS, OHIO, ASSIGNOR OF ONE-HALF TO CLARENCE C. LE MAY, OF COLUMBUS, OHIO.

ROCK BIT.

Application filed August 4, 1925. Serial No. 48,065.

The present invention is directed to improvements in rock bits for oil well drills.

The primary object of the invention is to provide a compact and stout bearing for rock bits of the rolling type.

A further object of the invention is to provide a bearing of this character so constructed that after becoming worn, which is a common defect in devices of this kind, the bearing can be easily and quickly adjusted to compensate for any wear which takes place.

A still further object of the invention is to provide a bearing of this kind with means constructed and arranged in such manner that the entrance of water and grit to the bearing is positively prevented and its detrimental effect eliminated, thus eliminating the normal wear of parts to a minimum.

With these and other objects in view this invention resides in the novel features of construction, formation, combination and arrangements of parts to be hereinafter more fully described, claimed and illustrated in the accompanying drawings, in which:—

Figure 1:
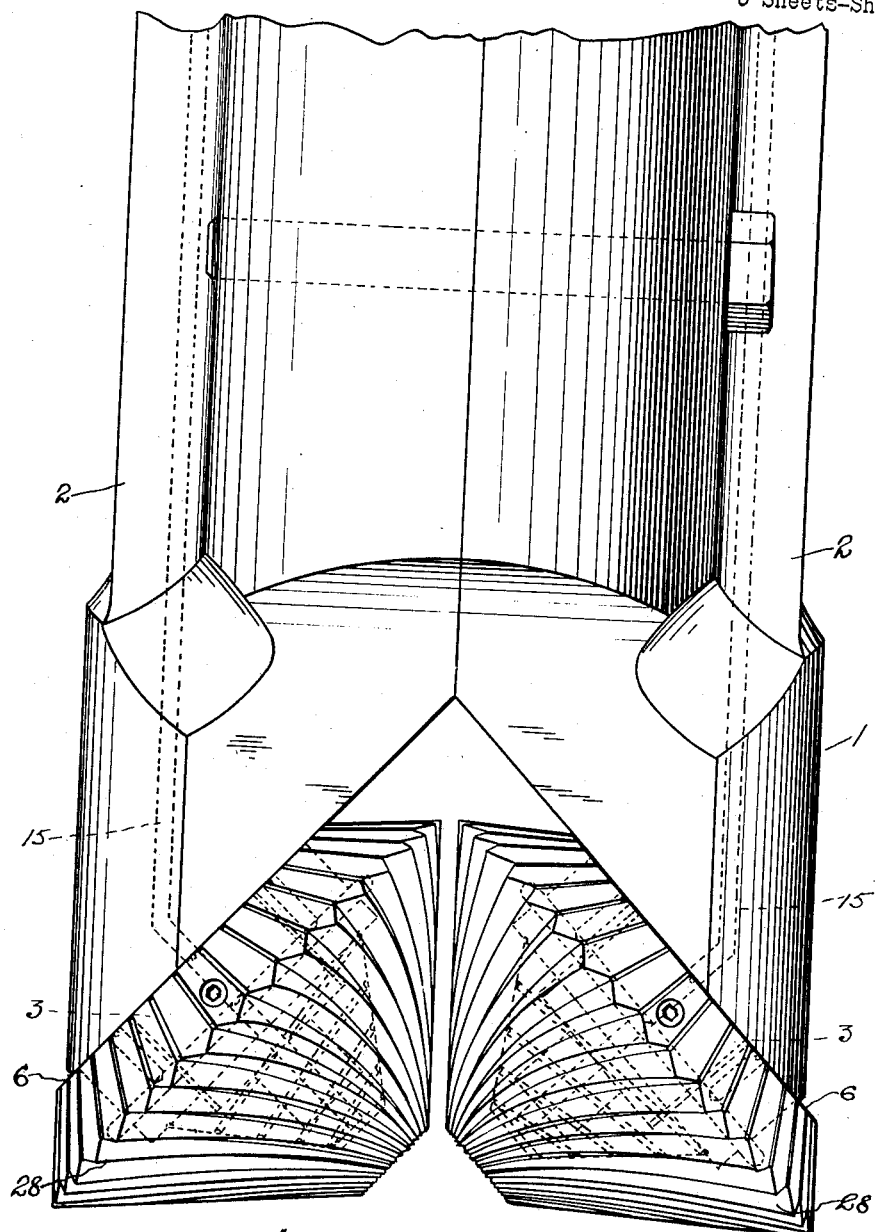
Figure 1 is a fragmentary side elevation of the device.
Figure 2:
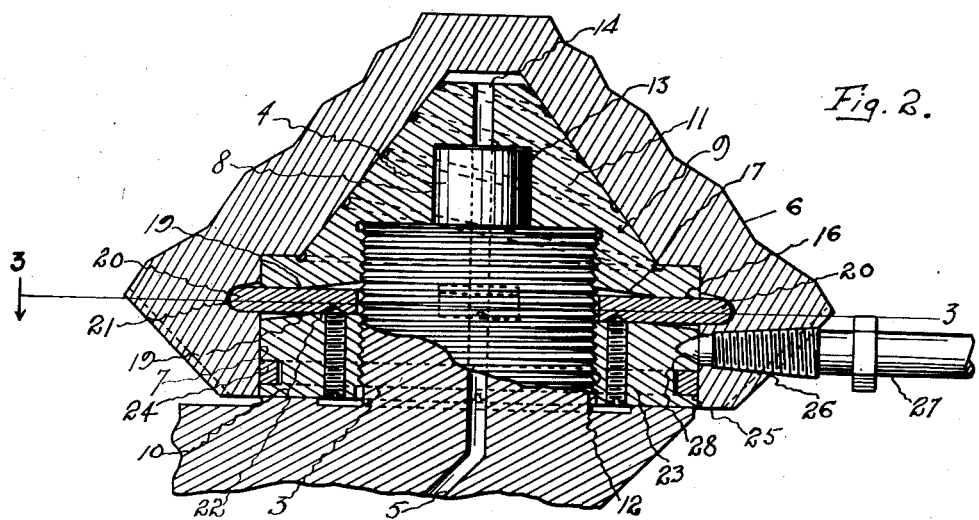
Figure 2 is a transverse sectional view through one of the bits.
Figure 3:
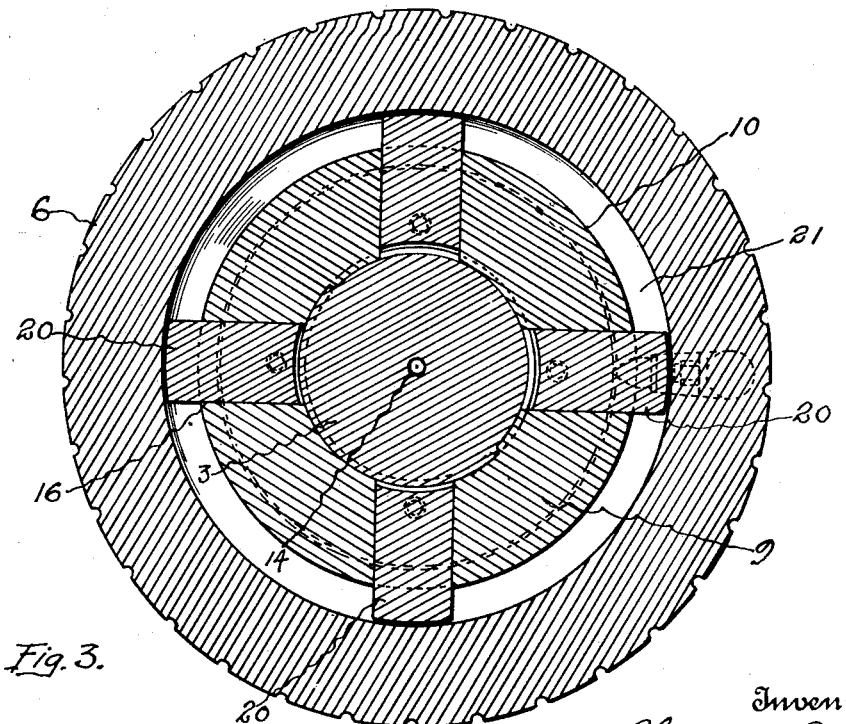
Figure 3 is a sectional view on line 3—3 of Figure 2.

The drill head 1 is formed from a pair of complementary sections 2, bolted together, as is customary, and are provided at their opposed beveled lower ends with threaded stub shafts 3, which are provided with reduced extensions 4, there being oil conducting passages 5 in said shafts, the purpose of which will appear later.

Each roller bit 6 is provided with a comparatively large recess 7 and counter-bore 8 and in which the bushing 9 is received. These bushings are each provided with a head 10 and an integrally connected tapered extension 11 which is adapted to snugly engage, respectively, in the recess 7 and counter-bore 8, it being essential that the inner end of the extension does not contact with the base of the counter-bore to permit adjustment of the bearing when worn, as will be obvious.

The bushing is provided with a threaded socket 12 and a counter-bore 13 for receiving, respectively, the stub shaft 3 and extension 4 in order to firmly secure the bearing thereto. The counter-bore 13 has opening thereinto an oil duct 14 which registers with the passage 5 of the stub shaft, the latter in turn registering with the passage 15 in the respective section 2. In this manner proper lubricant of the bearing is assured.

The head 10 is provided with radial slots 16, preferably four in number, said slots having opposed beveled walls 17 and 18 to provide oppositely disposed fulcrums 19 upon which the clamping plates 20 are adapted to rock when adjustments are made. The inner ends of the slots open in the socket 13 while their outer ends coincide with the annular groove 21 formed in the inner periphery of the bit 6. Thus it will be seen that the plates can be conveniently inserted in the slots 16 from the socket 13 or removed therefrom when desired.

The plates are provided with seats 22 for engagement with the inner ends of the locked set screws 23 carried by the head 10. It will be observed that since the outer ends of the plates rest in the groove 21 inward movement of the set screws 23 will rock the plates on the fulcrums 19 and as the parts wear such wear can be compensated for upon simply adjusting the set screws. It will be further observed that the plates 20 not only serve as means for adjusting the bearing but also constitutes means for rotatably interlocking the bearing with the bit 6.

To prevent any foreign matter from entering the bearing, a metallic packing ring 24 is employed and engages in the groove 25 of the head 10.

In order to interlock the bit 6 and stub shaft 9 so that they may be removed or replaced upon the stub shaft 3 the bit is tapped, as at 26 for the reception of the threaded end of the bar 27, the inner end of which engages the socket 28 formed in the head 10. In this manner the bearing shafts can be conveniently removed from the stub shafts, the tapped opening being afterwards plugged to prevent entrance of foreign matter.

Figure 4:
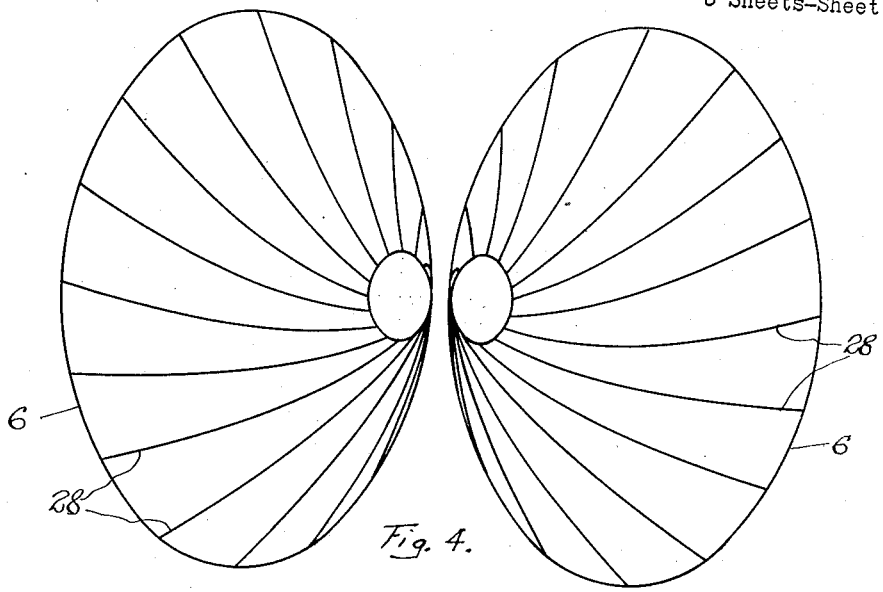
Figure 4 is an end view of the bits, shown diagrammatically.
Figure 5:
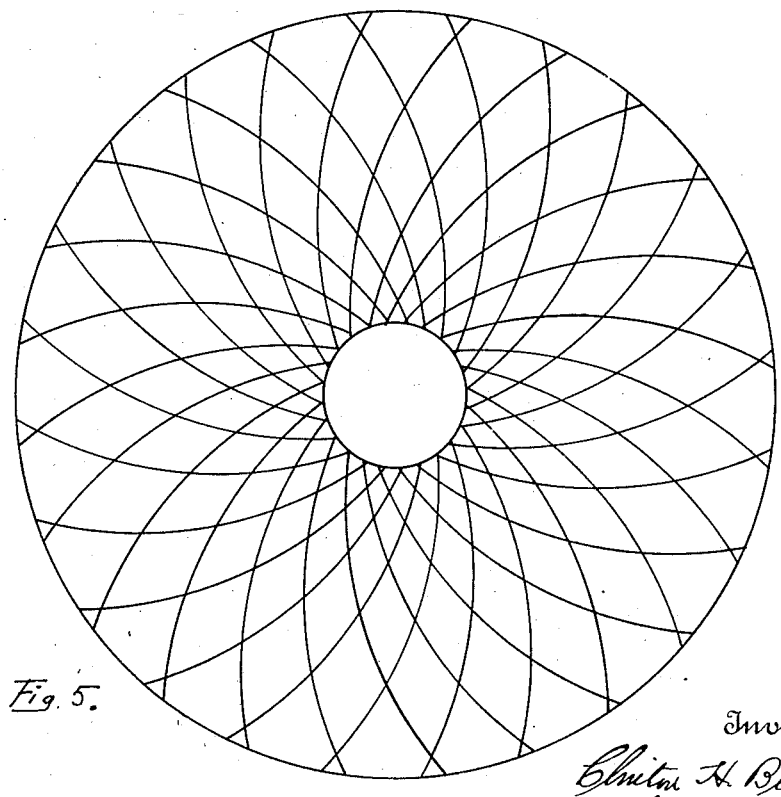
Figure 5 is a view of the bottom of the hole, showing diagrammatically the manner of cutting.

Upon reference to Figure 4 of the drawings, it will be observed that the ribs 28 of the bits are spirally arranged upon their cutting faces so that when the bits roll, during their cutting operation, the lines of cutting of one bit will be intersected by the cutting ribs of the bit following, thus chipping the rock into diamond formation, as shown in Figure 5. Thus the rock at the bottom of the hole will be effectively and quickly chipped.

It will be obvious that a bearing for bits of this nature constructed in accordance with my invention will be extremely strong and since wear can be compensated for, wobbling of the bits resulting from wear is eliminated, thereby eliminating the objectionable feature of drilling a hole of uneven diameter, which is often caused by bits rolling on worn bearings.

What is claimed is:—

1. The combination with a rotary drill head, of stub shafts carried thereby, bushings fixed to the stub shafts, bits rotatably engaged upon the bushings, plates interlocking the bits and bushings, and means for rocking the plates to take up wear between the bits and bushings.

2. The combination with a rotary drill head, of a stub shaft carried thereby, a bushing fixed to the stub shaft, the bushing having slots formed therein, plates rockable in the slots and engaged with a bit rotatable on the bushing, said plates interlocking the bit and bushing, and means carried by the bushing for rocking the plates to relatively adjust the bit and bushing.

3. The combination with a rotary drill head, of a stub shaft carried thereby, a bushing engaged with the stub shaft, a bit rotatably engaged upon the bushing, and plates rockable in the bearing shaft and rotatably interlocking the bit and body, as and for the purpose set forth.

4. The combination with a rotary drill head, of a stub shaft carried thereby, a bushing engaged with the stub shaft, a bit rotatable on the bushing, plates rockable in the bushing, said plates being adapted to rotatably interlock the bits with the bushing, and means for rocking the plates to relatively adjust the bit and bushing.

5. The combination with a rotary drill head, of a stub shaft carried thereby, a relatively large bushing fixed to the stub shaft, a bit rotatable on the bushing and having an annular groove formed therein, plates rockable in the bushing and having their outer ends slidably engaged in the groove, and means carried by the bushing for engagement with the inner ends of the plates to rock the same, as and for the purpose set forth.

6. The combination with a rotary drill head, of stub shafts carried thereby, bushings detachably engaged upon the stub shafts, roller bits engaged upon the bushings and having annular grooves formed therein, said bushing having radial slots formed therein coinciding with said grooves, plates rockable in the grooves and having their outer ends slidably engaged with the grooves, a set screw carried by the bushing and engaged with the inner ends of the plates to rock the same to relatively adjust the bushings and bits.

In testimony whereof I affix my signature.

CLINTON H. BULL.